US012010757B2

(12) United States Patent
Kalhan et al.

(10) Patent No.: US 12,010,757 B2
(45) Date of Patent: Jun. 11, 2024

(54) VEHICLE-TO-VEHICLE UNICAST/GROUPCAST COMMUNICATIONS BASED ON A PERIODIC DISCOVERY CHANNEL BROADCAST

(71) Applicants: Kyocera Corporation, Kyoto (JP); Amit Kalhan, San Diego, CA (US); Henry Chang, San Diego, CA (US)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 521 days.

(21) Appl. No.: 17/289,596

(22) PCT Filed: Nov. 1, 2019

(86) PCT No.: PCT/US2019/059405
§ 371 (c)(1),
(2) Date: Apr. 28, 2021

(87) PCT Pub. No.: WO2020/092911
PCT Pub. Date: May 7, 2020

(65) Prior Publication Data
US 2021/0400461 A1    Dec. 23, 2021

Related U.S. Application Data

(60) Provisional application No. 62/754,393, filed on Nov. 1, 2018.

(51) Int. Cl.
*H04W 8/00*    (2009.01)
*H04L 1/00*    (2006.01)
(Continued)

(52) U.S. Cl.
CPC ........... *H04W 8/005* (2013.01); *H04L 1/0003* (2013.01); *H04L 1/1896* (2013.01); *H04W 84/18* (2013.01)

(58) Field of Classification Search
None
See application file for complete search history.

(56) References Cited

U.S. PATENT DOCUMENTS 10,257,687 B2 *  4/2019  Deng ................... H04W 48/20
10,531,254 B2 *  1/2020  Va ........................ H04W 76/10
(Continued)

OTHER PUBLICATIONS

Li, Haipeng and Zhen Xu; "Routing Protocol in VANETs Equipped with Directional Antennas: Topology-Based Neighbor Discovery and Routing Analysis"; Hindawi, Wireless Communications and Mobile Computing, vol. 2018, Article ID: 7635143, Apr. 10, 2018, pp. 1-13 [Retrieved on: Feb. 5, 2020]. Retrieved from the Internet: <URL: https://www.hindawi.com/journals/wcmc/2018/7635143>.
(Continued)

*Primary Examiner* — Brian S Roberts

(57) ABSTRACT

The methods, devices, and systems discussed herein describe a wireless communication device broadcasting a periodic discovery channel message that includes an identifier associated with the wireless communication device that indicates its presence to neighboring wireless communication devices. If the neighboring wireless communication devices receive the periodic discovery channel message transmission above a pre-defined received power threshold and successfully decode the periodic discovery channel message, then the transmitting wireless communication device is added to the neighboring wireless communication devices neighboring device list. After receiving the periodic discovery channel messages from all of the neighboring wireless communication devices, a wireless communication device is able to identify all of its immediate neighboring devices and form its neighboring device list. Based on detecting periodic discovery channel message transmissions, a wireless communication device periodically updates
(Continued)

its neighboring device list with new additions or removals of neighboring wireless communication devices.

24 Claims, 5 Drawing Sheets

(51) Int. Cl.
  *H04L 1/1867* (2023.01)
  *H04W 84/18* (2009.01)

(56) References Cited

U.S. PATENT DOCUMENTS

| | | | | |
|---|---|---|---|---|
| 10,602,329 | B2* | 3/2020 | Addepalli | G06F 21/45 |
| 2004/0116143 | A1* | 6/2004 | Love | H04L 1/20 |
| | | | | 455/522 |
| 2008/0165786 | A1* | 7/2008 | Ahuja | H04L 45/00 |
| | | | | 370/395.2 |
| 2010/0080168 | A1* | 4/2010 | Fukuyama | H04W 8/005 |
| | | | | 370/328 |
| 2011/0044172 | A1 | 2/2011 | Yim et al. | |
| 2015/0327047 | A1* | 11/2015 | Tiirola | H04W 4/70 |
| | | | | 370/338 |
| 2016/0219506 | A1 | 7/2016 | Pratt et al. | |
| 2016/0227380 | A1* | 8/2016 | Zhang | H04W 4/90 |
| 2016/0323922 | A1* | 11/2016 | Park | H04W 24/10 |
| 2018/0146478 | A1* | 5/2018 | Kim | H04W 72/23 |
| 2019/0007974 | A1* | 1/2019 | Nguyen | H04L 67/12 |
| 2020/0162864 | A1* | 5/2020 | Lee | H04L 1/1671 |

OTHER PUBLICATIONS

Khan, Faisal Ahmad; "Safety-Message Routing in Vehicular ADHOC Networks"; Electrical and Computer Engineering, Georgia Institute of Technology, May 2013 [Retrieved on: Feb. 5, 2020]. Retrieved from the Internet: <URL: https://smartech.gatech.edu/bitstream/handle/1853/47743/khan_faisal_a_201212_phd.pdf>.

Ericsson; "Clustering and Cluster Head Election Schemes", R1-1811600; 3GPP TSG RAN WG1 #94bis; Chengdu, CN; Sep. 28, 2018.

* cited by examiner

VEHICLE-TO-VEHICLE UNICAST/GROUPCAST COMMUNICATIONS BASED ON A PERIODIC DISCOVERY CHANNEL BROADCAST

CLAIM OF PRIORITY

The present application claims priority to Provisional Application No. 62/754,393, entitled "VEHICLE-TO-VEHICLE UNICAST/GROUPCAST COMMUNICATIONS BASED ON THE PERIODIC DISCOVERY CHANNEL BROADCAST", filed Nov. 1, 2018, which is assigned to the assignee hereof and hereby expressly incorporated by reference in its entirety.

FIELD

This invention generally relates to wireless communications and more particularly to vehicle-to-everything (V2X) communications between wireless communication devices.

BACKGROUND

A vehicle ad-hoc network (VANET) is an autonomously created wireless network of vehicles. In some VANETs, the wireless communication devices, which are located within the vehicles of the VANET, autonomously select the time-frequency resources for data transmissions to other vehicles within the VANET. However, if the number of transmitting vehicle-to-vehicle (V2V) devices is large with respect to the resources available for data transmissions, the probability of data transmission collisions is high.

SUMMARY

The methods, devices, and systems discussed herein describe a wireless communication device broadcasting a periodic discovery channel message that includes an identifier associated with the wireless communication device that indicates its presence to neighboring wireless communication devices. In some examples, the periodic discovery channel message is transmitted using a pre-defined, fixed transmit power and modulation and coding scheme (MCS). If the neighboring wireless communication devices receive the periodic discovery channel message transmission above a pre-defined received power threshold and successfully decode the periodic discovery channel message, then the transmitting wireless communication device is added to the neighboring wireless communication devices' neighboring device list.

After receiving the periodic discovery channel messages from all of the neighboring wireless communication devices, a wireless communication device is able to identify all of its immediate neighboring devices and form its neighboring device list. Based on detecting periodic discovery channel message transmissions, a wireless communication device periodically updates its neighboring device list with new additions or removals of neighboring wireless communication devices.

DETAILED DESCRIPTION

Figure 1:
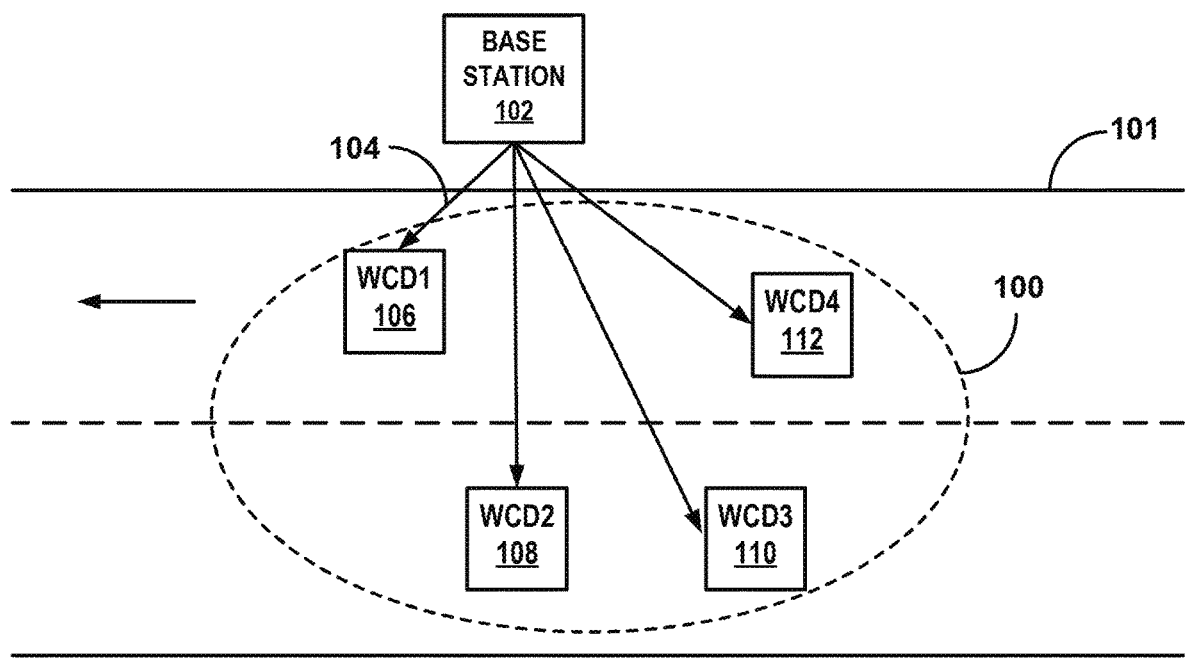
FIG. 1 is a block diagram of an example of a system in which a plurality of wireless communication devices are nodes of a vehicle ad-hoc network (VANET).

The examples discussed below are generally directed to vehicle-to-vehicle (V2V) communication between two or more vehicles that are part of a vehicle ad-hoc network (VANET). However, any of the following examples may be applied to vehicle-to-everything (V2X) communication, which is the passing of information from a vehicle to any entity that may affect the vehicle or that the vehicle may affect. For example, V2X is a vehicular communication system that incorporates other, more specific types of communication, including V2V, V2I (vehicle-to-infrastructure), V2N (vehicle-to-network), V2P (vehicle-to-pedestrian), V2D (vehicle-to-device), and V2G (vehicle-to-grid). There are two types of V2X communication technology depending on the underlying technology being used: wireless local area network (WLAN)-based V2X, and cellular-based V2X (C-V2X). Some examples of V2X protocols include Long-Term Evolution (LTE) (Rel-14) V2X Mode 4 and 5G New Radio (NR) V2X Mode 2.

In order to avoid data transmission collisions in the VANET, the wireless communication devices interested in data transmission first perform energy-sensing during a set of time-slots to find unused time-slots. Once an unused time-slot is found and selected, the wireless communication device uses the selected time-slot for data transmissions. The energy-sensing technique works very well when all the transmissions are periodic.

For example, after sensing for only one period, the wireless communication devices are able to identify the unused time-slots that can be used for their own data transmissions. In these examples, a wireless communication device transmits a periodic message in the $n^{th}$ time-slot of a frame, where a frame has N time-slots. Based on the periodicity of the transmissions, the neighboring wireless communication devices are able to predict that the transmitting wireless communication device's subsequent data transmissions would occur at the $(n+N)^{th}$, $(n+2N)^{th}$, ..., $(n+KN)^{th}$ time-slots. Hence, the neighboring wireless communication devices refrain from selecting the $(n+N)^{th}$, $(n+2N)^{th}$, ..., $(n+KN)^{th}$ time-slots for their data transmissions. To achieve fairness, the time-slot ownership expires after the $K^{th}$ transmission. If the transmitting wireless communication device has a new data packet to transmit, then the transmitting wireless communication device repeats the energy-sensing and selection procedure to find a new, unused time-slot.

The foregoing energy-sensing technique is sufficient for periodic broadcast transmissions. However, in unicast and groupcast transmissions, the data transmitting wireless communication device needs to know if the intended receiver(s) are available to receive the data transmission. In some VANET technologies such as Institute of Electrical and Electronics Engineers (IEEE) 802.11p, the transmitting wireless communication device and the receiving wireless communication device exchange handshaking Request-to-Transmit (RTS) and Clear-to-Transmit (CTS) signals before the data transmission. After receiving the data transmission, the receiving wireless communication device transmits an acknowledgement (ACK) signal to the transmitting wireless communication device. In C-V2X, there is no pre-data transmission handshaking signal exchange mechanism. The following sections describe such a mechanism.

For example, the methods, devices, and systems discussed herein describe a wireless communication device broadcasting a periodic discovery channel message that includes an identifier associated with the wireless communication device that indicates its presence to neighboring wireless communication devices. In some examples, the periodic discovery channel message is transmitted using a pre-defined, fixed transmit power and modulation and coding scheme (MCS). In other examples, the control channel transmissions, such as the Physical Sidelink Control Channel (PSCCH) in NR V2X, could be viewed as a discovery message if the control channel transmission includes a source identifier (source ID). If the neighboring wireless communication devices receive the periodic discovery channel message transmission above a pre-defined received power threshold and successfully decode the periodic discovery channel message, then the transmitting wireless communication device is added to the neighboring wireless communication devices' neighboring device list.

After receiving the periodic discovery channel messages from all of the neighboring wireless communication devices, a wireless communication device is able to identify all of its immediate neighboring devices and form its neighboring device list. Based on detecting periodic discovery channel message transmissions, a wireless communication device periodically updates its neighboring device list with new additions or removals of neighboring wireless communication devices.

FIG. 1 is a block diagram of an example of a system in which a plurality of wireless communication devices are nodes of a vehicle ad-hoc network (VANET). For the example of FIG. 1, VANET 100 is located on roadway 101 and includes first wireless communication device, WCD1, 106, second wireless communication device, WCD2, 108, third wireless communication device, WCD3, 110, and fourth wireless communication device, WCD4, 112. In other examples, VANET 100 may have a different number of wireless communication devices than that shown in FIG. 1.

VANET 100 is wirelessly connected to a radio access network (not shown) via base station 102, which provides various wireless services to one or more of the wireless communication devices that are part of VANET 100. For the example shown in FIG. 1, VANET 100 operates in accordance with at least one revision of the 3rd Generation Partnership Project Long Term Evolution (3GPP LTE) communication specification. In other examples, VANET 100 may operate in accordance with other communication specifications.

In the interest of clarity and brevity, only one base station 102 is shown in FIG. 1. However, in other examples, any suitable number of base stations may be utilized by VANET 100 in order to obtain/maintain communication with the network. For the example shown in FIG. 1, base station 102, sometimes referred to as eNodeB or eNB, communicates with wireless communication devices 106, 108, 110, 112 via wireless communication link 104.

For the example shown in FIG. 1, wireless communication link 104 is shown as a broadcast downlink signal from base station 102 to wireless communication devices 106, 108, 110, 112. Wireless communication devices 106, 108, 110, 112 are also capable of transmitting uplink signals (not shown) to base station 102. In the example of FIG. 1, wireless communication devices 106, 108, 110, 112 are each integrated into a vehicle as an onboard unit (OBU). In other examples, wireless communication devices 106, 108, 110, 112 may simply be user equipment (UE) devices that are located within a vehicle. Some examples of user equipment devices include: a mobile phone, a transceiver modem, a personal digital assistant (PDA), or a tablet, for example. Each wireless communication device 106, 108, 110, 112 that is connected to VANET 100 is considered to be a node of VANET 100.

Figure 2A:
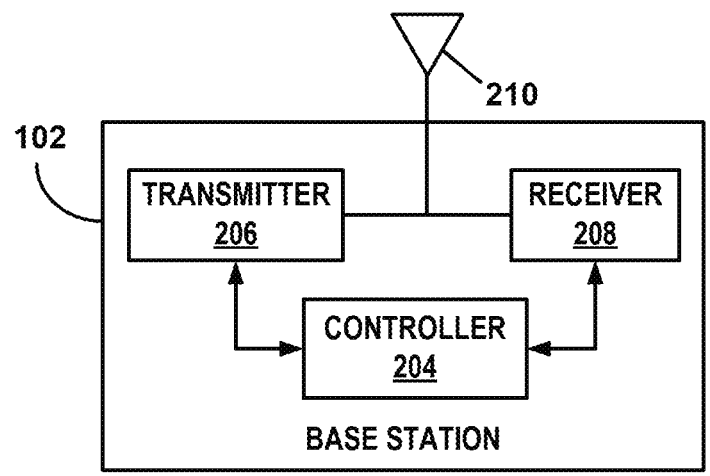
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of the downlink signal 104 and can apply any one of a plurality of modulation orders. The demodulator demodulates any uplink signals received at base station 102 in accordance with one of a plurality of modulation orders.

As mentioned above, base station 102 provides (1) various wireless services to one or more wireless communication devices 106, 108, 110, 112, and (2) network connectivity to VANET 100. Base station 102 provides these services and connectivity by transmitting downlink signal 104, via transmitter 206 and antenna 210, to wireless communication devices 106, 108, 110, 112. In the example of FIG. 1, the downlink signal 104 is transmitted in a System Information Block (SIB) message that is broadcast to all wireless communication devices 106, 108, 110, 112 that are nodes of VANET 100. Although not explicitly shown in FIG. 1, base station 102 is capable of receiving uplink signals, via antenna 210 and receiver 208, from wireless communication devices 106, 108, 110, 112.

Figure 2B:
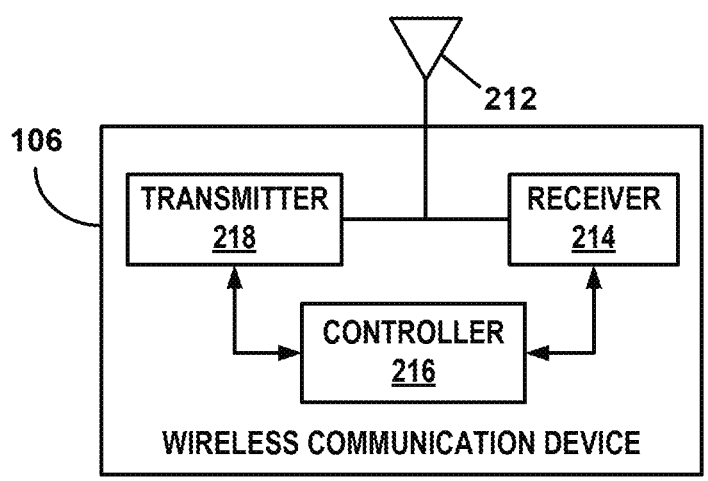
FIG. 2B is a block diagram of an example of a wireless communication device shown in FIG. 1.

As shown in FIG. 2B, wireless communication device 106 comprises controller 216, transmitter 218, and receiver 214, as well as other electronics, hardware, and code. Although FIG. 2B specifically depicts the circuitry and configuration of wireless communication device 106, the same wireless communication device circuitry and configuration is utilized for wireless communication devices 108, 110, 112 in VANET 100. Wireless communication device 106 is any fixed, mobile, or portable equipment that performs the functions described herein. The various functions and operations of the blocks described with reference to wireless communication device 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a wireless communication device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the wireless communication device functions. The required components may depend on the particular functionality required by the wireless communication device.

Transmitter 218 includes a modulator (not shown), and receiver 214 includes a demodulator (not shown). The modulator can apply any one of a plurality of modulation orders to modulate the signals to be transmitted as uplink signals (not shown). The demodulator demodulates the downlink signals 104 in accordance with one of a plurality of modulation orders.

Figure 3:
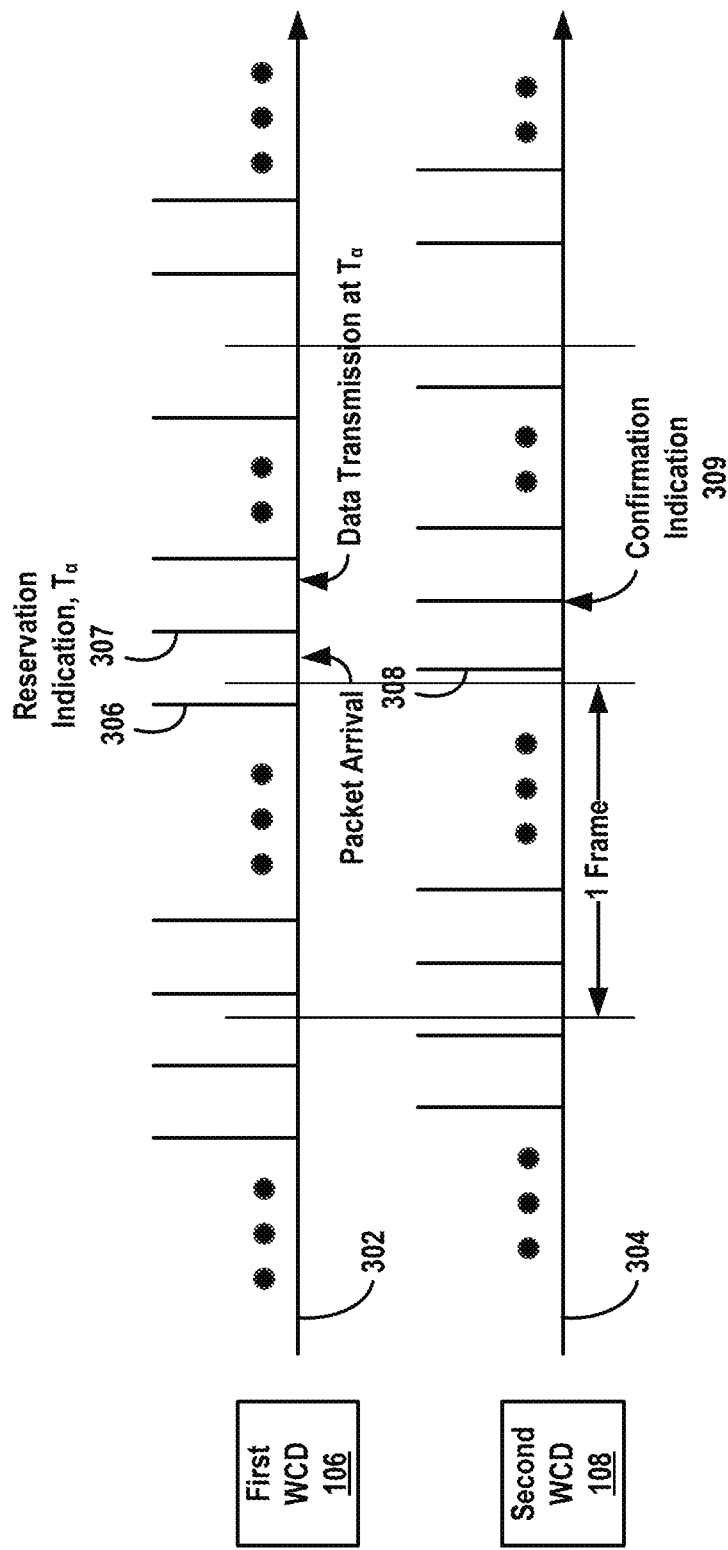
FIG. 3 is a diagram of an example of a timing chart with first and second wireless communication devices broadcasting their respective periodic discovery channel messages.
Figure 4:
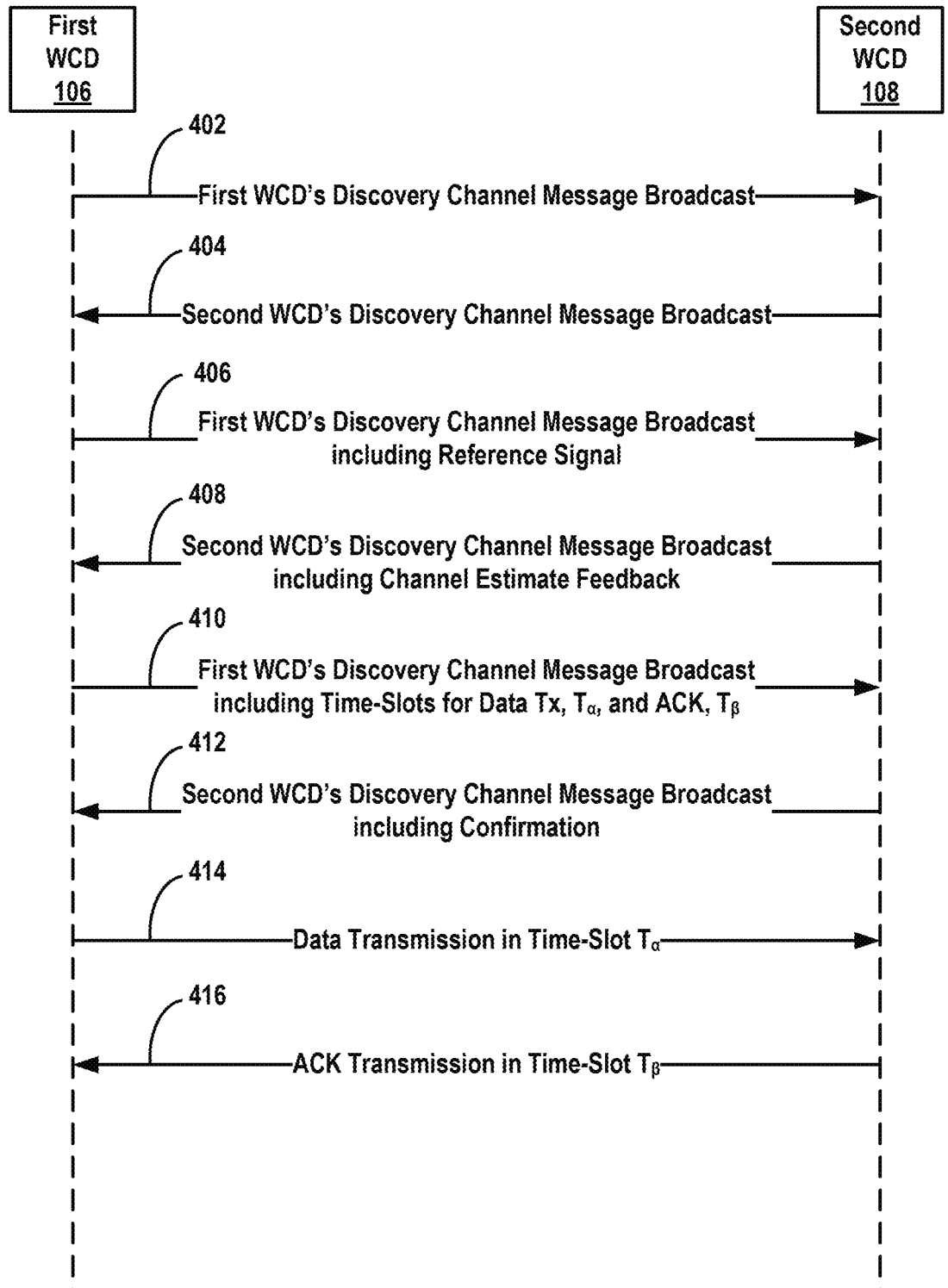
FIG. 4 is an example of a messaging diagram that shows the messages exchanged between first and second wireless communication devices.

FIG. 3 is a diagram of an example of a timing chart with first and second wireless communication devices 106, 108 of VANET 100 broadcasting their respective periodic discovery channel messages over the course of several frames, each of which is 1000 ms in duration. For the example shown in FIG. 3, timeline 302 illustrates the occurrence of different events at first wireless communication device 106, and timeline 304 illustrates the occurrence of different events at second wireless communication device 108. FIG. 4 is an example of a messaging diagram that shows the messages exchanged between first and second wireless communication devices 106, 108. FIGS. 3 and 4 will be referenced together in order to more fully describe the operation of wireless communication devices 106, 108. Although FIGS. 3 and 4 only show two wireless communication devices transmitting periodic discovery channel messages to each other, any suitable number of wireless communication devices may transmit periodic discovery channel messages to each other, in other examples.

In operation, first wireless communication device 106 broadcasts, via its transmitter 218 and antenna 212, a first periodic discovery channel message 306 that includes an identifier associated with first wireless communication device 106 that indicates the presence of first wireless communication device 106 to second wireless communication device 108. In the example shown in FIG. 3, first wireless communication device 106 broadcasts a series of first periodic discovery channel messages 306, which are transmitted periodically every 40 ms. A shorter or longer period may be used, in other examples. In some examples, the periodic discovery channel messages are transmitted using a pre-defined, fixed transmit power and modulation and coding scheme (MCS).

Second wireless communication device 108 receives the first periodic discovery channel message 306 via its antenna 212 and receiver 214. In FIG. 4, the first periodic discovery channel message 306 is represented by signal 402. Upon receipt of the first periodic discovery channel message 306, second wireless communication device 108 utilizes its controller 216 to determine (1) if the first periodic discovery channel message 306 was received with a signal strength above a threshold, and (2) if second wireless communication device 108 is able to successfully decode the first periodic discovery channel message 306. If both conditions are met, then first wireless communication device 106 is added to a neighboring device list stored in a memory (not shown) of second wireless communication device 108.

Similarly, second wireless communication device 108 broadcasts, via its transmitter 218 and antenna 212, a second periodic discovery channel message 308 that includes an identifier associated with second wireless communication device 108 that indicates the presence of second wireless communication device 108 to first wireless communication device 106. In the example shown in FIG. 3, second wireless communication device 108 broadcasts a series of second periodic discovery channel messages 308, which are transmitted periodically every 40 ms. A shorter or longer period may be used in other examples. In some examples, the periodic discovery channel messages are transmitted using a pre-defined, fixed transmit power and modulation and coding scheme (MCS).

First wireless communication device 106 receives the second periodic discovery channel message 308 via its antenna 212 and receiver 214. In FIG. 4, the second periodic discovery channel message 308 is represented by signal 404. Upon receipt of the second periodic discovery channel message 308, first wireless communication device 106 utilizes its controller 216 to determine (1) if the second periodic discovery channel message 308 was received with a signal strength above a threshold, and (2) if first wireless communication device 106 is able to successfully decode the second periodic discovery channel message 308. In some examples, the threshold value can be varied based on traffic and network congestion conditions. If both conditions are met, then second wireless communication device 108 is added to a neighboring device list stored in a memory (not shown) of first wireless communication device 106.

In the example shown in FIG. 3, the periodic discovery channel messages 306, 308 are transmitted within different time-slots relative to each other. This is particularly advantageous in the case of half-duplex wireless communication devices, which must each broadcast their own discovery channel messages in a time-slot in which none of the other neighboring wireless communication devices are transmitting. In one example, each wireless communication device finds an unused time-slot and then broadcasts its discovery channel message in the unused time-slot. Once the discovery channel message broadcast is received by all the neighboring wireless communication devices, it is assumed that the wireless communication device that transmitted the discovery channel message will continue re-broadcasting subsequent discovery channel messages in the next periodic time-slot that corresponds with the time-slot used to broadcast the discovery channel message.

After receiving the periodic discovery channel messages from all of the neighboring wireless communication devices, a wireless communication device is able to identify all of its immediate neighbors and form its neighboring device list. Based on the detected periodic discovery channel messages, a wireless communication device periodically updates its neighboring device list with new additions or removals of neighboring wireless communication devices. An updated neighboring device list is important because, during groupcast transmissions which are discussed more fully below, only those wireless communication devices that are on the neighboring device list of the transmitting wireless communication device are allowed to transmit a negative-acknowledgement (NACK) signal if the receiving wireless communication device is unable to decode the transmitted data packet. Even if a neighboring wireless communication device were to send a NACK when the neighboring wireless communication device's neighboring device list includes the transmitting wireless communication device, the transmitting wireless communication device must ignore a NACK received from a neighboring wireless communication device that is not in its neighboring device list, in some examples. This imbalance in which only one of the transmitting wireless communication device and the receiving wireless communication device were listed on the other's neighboring device list could occur, for example, due to variations in the radio channel when their respective discovery channel messages were received.

Under heavy traffic conditions, it is possible that too many wireless communication devices broadcast their respective discovery channel messages, causing excessive transmissions. In some examples, to avoid excessive transmissions, the wireless communication devices broadcast their respective discovery channel messages with a periodicity equal to the expected rate of change in their respective neighboring device lists. Stated differently, if a wireless communication device does not expect its neighboring device list to change very often, the wireless communication device would transmit its discovery channel message with a relatively longer period between transmissions. However, if a wireless communication device expects its neighboring device list to change often, the wireless communication device would transmit its discovery channel message with a relatively shorter period between transmissions.

In other examples, the wireless communication devices consistently broadcast their respective discovery channel messages because the neighboring wireless communication devices rely on each other's broadcast to maintain an updated neighboring device list. Additionally, once a wireless communication device finds an available time-slot and uses it to broadcast its discovery channel message, then the wireless communication device keeps using the same time-slot to periodically broadcast its discovery channel message. Otherwise, the neighboring wireless communication devices assume that the transmitting wireless communication device that was utilizing a particular time-slot has left the region and that its particular time-slot has become available.

In still other examples, the wireless communication devices may begin to transmit their respective periodic discovery channel messages after a certain trigger condition is met. For example, the start of the periodic discovery channel message transmission may depend on (1) whether any traffic data arrives at a data buffer of the wireless communication device, and/or (2) whether any discovery channel messages are received from a neighboring wireless communication device, which indicates that a neighboring wireless communication device is ready to transmit groupcast data. The use of conditions to trigger transmission of the discovery channel messages has the benefit of keeping the time-slots free for other wireless communication devices to use if no groupcast connection is expected by any of the wireless communication devices in the group.

In C-V2X based networks, the handshaking signal exchange mechanism can be introduced if, prior to data transmission, the transmitting wireless communication device 106 transmits a periodic discovery channel message 306 that comprises at least one of the following: a destination identifier associated with at least one intended recipient wireless communication device, a reference signal, resource location information associated with a future data transmission, transmit power information associated with a future data transmission, modulation and coding scheme (MCS) information associated with a future data transmission, multiple-input and multiple-output (MIMO) parameter information associated with a future data transmission, resource location information associated with an expected response message from at least one intended recipient wireless communication device, Global Positioning System (GPS) information associated with the first wireless communication device 106, and a message identifier to identify at least one of the following: message type, sequence, priority, and an application identifier. The destination identifier is associated with at least one intended recipient wireless communication device 108. The reference signal is sent so the recipient wireless communication device 108 can estimate the channel state between wireless communication devices 106, 108 and provide feedback to transmitting wireless communication device 106. The resource location information associated with a future data transmission indicates the time-frequency location, within a time-frequency domain, of a future data transmission that will be transmitted by the transmitting wireless communication device 106. The transmit power information associated with a future data transmission indicates a power level at which wireless communication device 106 will transmit a future data transmission. Modulation and coding scheme (MCS) information associated with a future data transmission indicates an MCS that wireless communication device 106 will use when modulating and coding a future data transmission. Multiple-input and multiple-output (MIMO) parameter information associated with a future data transmission indicates MIMO parameters wireless communication device 106 will use when transmitting a future data transmission. Resource location information associated with an expected response message from at least one intended recipient wireless communication device indicates the time-frequency location, within a time-frequency domain, where transmitting wireless communication device 106 expects to receive a response message (e.g., ACK or NACK) from receiving wireless communication device 108. The GPS information associated with the first wireless communication device 106 includes, for example, information such as the wireless communication device's geo-location, speed, heading, and zone identifier. The message identifier identifies at least one of the following with regard to the message being sent by wireless communication device 106: message type, sequence, priority, and an application identifier.

As shown in FIG. 3, upon arrival of a data packet in a data buffer of first wireless communication device 106, first wireless communication device 106 uses its next periodic discovery channel message 307 to indicate its intention to communicate with second wireless communication device 108. In the example shown in FIG. 3, the periodic discovery channel message 307 includes a destination identifier (e.g., Destination ID) associated with second wireless communication device 108, resource location information (e.g., Reservation Indicator, $T_\alpha$, in FIG. 3) associated with a future data transmission from first wireless communication device 106, the transmit power of the future data transmission, and the MCS and MIMO parameters that second wireless communication device 108 will need to successfully decode the future data transmission. In FIG. 4, periodic discovery channel message 307 is represented by signal 410. In response, second wireless communication device 108 transmits a confirmation in its periodic discovery channel message 309. In FIG. 4, periodic discovery channel message 309 is represented by signal 412. Upon receipt of the confirmation, first wireless communication device 106 transmits a data transmission at the previously indicated time-slot, $T_\alpha$. In FIG. 4, this data transmission is represented by signal 414.

FIG. 4 shows a more detailed signaling flow when first wireless communication device 106 sends a unicast transmission to second wireless communication device 108. As described above, first and second wireless communication devices 106, 108 broadcast their respective periodic discovery channel messages 402, 404. First and second wireless communication devices 106, 108 receive each other's periodic discovery channel messages 402, 404 and update their respective neighboring device lists. Upon a data packet arriving at a data buffer of first wireless communication device 106, first wireless communication device 106 becomes interested in transmitting the data packet to second wireless communication device 108. First wireless communication device 106 transmits its periodic discovery channel message with a reference signal 406 to acquire channel state information feedback from second wireless communication device 108.

Upon receipt of the reference signal 406, second wireless communication device 108 estimates (e.g., determines) the channel state between wireless communication devices 106, 108 based, at least partially, on characteristics of the received reference signal 406. In some examples, second wireless communication device 108 sends the channel state information feedback to first wireless communication device 106 in periodic discovery channel message 408, as a matter of course. In other examples, second wireless communication device 108 sends a feedback message 408, upon determining that channel conditions between first wireless communication device 106 and second wireless communication device 108 are below a threshold.

In the example shown in FIG. 4, first wireless communication device 106 selects the transmit power and the MCS to use for its upcoming data transmission, based, at least partially, on the channel state information feedback. In other examples, the transmit power and the MCS are pre-defined. In the example shown in FIG. 4, first wireless communication device 106 senses the time-slots and selects time-slot $T_\alpha$ for its data transmission and time-slot $T_\beta$ for second wireless communication device 108 to transmit its ACK/NACK. First wireless communication device 106 includes the information regarding the selected time-slots $T_\alpha$, $T_\beta$ in its next discovery channel message broadcast 410. In response, second wireless communication device 108 sends a confirmation as a part its discovery channel message broadcast 412. First wireless communication device 106 transmits its data transmission in time-slot $T_\alpha$ 414. In response, second wireless communication device 108 transmits its ACK/NACK in time-slot $T_\beta$ 416.

In instances where second wireless communication device 108 is unable to decode the data transmission that was intended for second wireless communication device 108, second wireless communication device 108 transmits a negative-acknowledgement (NACK) in time-slot $T_\beta$ 416. In some examples, the NACK is only transmitted from second wireless communication device 108 when first wireless communication device 106 is on a neighboring device list of second wireless communication device 108. In other examples, the NACK is transmitted from second wireless communication device 108 via one of the following: a resource location associated with an expected response message (e.g., time-slot $T_\beta$ 416) from second wireless communication device 108, and a next periodic discovery channel message transmitted from second wireless communication device 108.

If first wireless communication device 106 desires to transmit a groupcast transmission rather than a unicast transmission, first wireless communication device 106 selects a set of intended receiving wireless communication devices 108, 110 from its neighboring device list before transmitting the groupcast transmission. Identifiers associated with each of the selected set of receiving wireless communication devices 108, 110 are sent in the "Destination ID" field of the control channel (e.g., the Physical Sidelink Control Channel (PSCCH) in C-V2X). After decoding the control channel, each receiving wireless communication device 108, 110 knows if the corresponding data transmission is intended for it or not. If an identifier associated with the receiving wireless communication device 108 is listed in the "Destination ID" field but the receiving wireless communication device 108 is unable to decode the data transmission, then the receiving wireless communication device 108 transmits a NACK to the transmitting wireless communication device 106.

The same signaling flow presented in FIG. 4 is applied to groupcast transmissions except for the following four differences, each of which will be discussed in turn. First, transmitting wireless communication device 106 includes the identifiers associated with each of the selected set of receiving wireless communication devices 108, 110 in the periodic discovery channel message broadcast 402 to initiate the groupcast connection request. Alternatively, transmitting wireless communication device 106 may include just an identifier of a group (e.g., Group ID with which receiving wireless communication devices 108, 110 are collectively associated) in the periodic discovery channel message broadcast 402 to initiate the groupcast connection request, and in this case, each receiving wireless communication device 108, 110 could send a confirmation message to the transmitting wireless communication device 106 in their respective discovery channel message broadcast. However, if all the intended receiving wireless communication devices 108, 110 send the confirmation, then it would cause an unnecessary delay since transmitting wireless communication device 106 must wait until it receives all of the confirmations. Therefore, in some examples of the groupcast case, transmission of the confirmation in the discovery channel message broadcasts of receiving wireless communication devices 108, 110 is omitted.

Second, in the groupcast scenario, the channel estimation exchange between transmitting wireless communication device 106 and receiving wireless communication devices 108, 110 becomes difficult. Similar to the previous discussion regarding transmitting wireless communication device 106 receiving confirmation messages from multiple receiving wireless communication devices 108, 110, transmitting wireless communication device 106 having to wait to receive a channel feedback message from each of receiving wireless communication devices 108, 110 can cause an unacceptable delay. Therefore, in some examples, the channel estimation exchange between transmitting wireless communication device 106 and receiving wireless communication devices 108, 110 is omitted. In other examples, transmitting wireless communication device 106 transmits a reference signal in the discovery channel message broadcast 406. Instead of each receiving wireless communication device 108, 110 sending a feedback message, only receiving wireless communication devices 108, 110 that experience a channel condition that is worse than expected (e.g., lower than a threshold) send a feedback message to transmitting wireless communication device 106. This feedback message is sent on the discovery channel message broadcast 408. In still further examples, receiving wireless communication devices 108, 110 utilize a data channel to transmit any required feedback messages. In this manner, transmitting wireless communication device 106 does not need to wait to receive the feedback messages. Rather, one or more of the receiving wireless communication devices 108, 110 transmits a feedback message via a unicast data transmission based on the channel estimation performed after receiving the reference signal from transmitting wireless communication device 106.

Third, in some examples, the groupcast case requires adding a list of identifiers associated with a set of intended receiving wireless communication devices 108, 110 to the "Destination ID" field of a control channel. This increases the control channel overhead. However, this overhead is eliminated if transmitting wireless communication device 106 does not include the list of identifiers in the control channel. Rather, transmitting wireless communication device 106 includes its own identifier in the control channel as the "Source ID." Then, if one of receiving wireless communication devices 108, 110 desires to send a NACK back to transmitting wireless communication device 106, the receiving wireless communication device only sends the NACK if transmitting wireless communication device 106 is listed in the neighboring device list of the receiving wireless communication device. In other examples, transmitting wireless communication device 106 may also include the "Group ID" in addition to the "Source ID," so that any neighboring wireless communication device 112, which is not part of the group that is associated with the "Group ID," can ignore the transmissions from transmitting wireless communication device 106.

Fourth, as mentioned earlier, after receiving the data transmission, if an intended receiving wireless communication device 108 is only able to decode the control information but not the data packet, then intended receiving wireless communication device 108 transmits a NACK back to transmitting wireless communication device 106 using the assigned time-slot $T_\beta$. Alternatively, if the ACK/NACK time-slot $T_\beta$ is not assigned, then receiving wireless communication device 108 transmits the NACK in its next discovery channel message broadcast.

Although the foregoing description focused on wireless communication device 106 as transmitting a data transmission (e.g., the transmitting wireless communication device) and one or more of wireless communication devices 108, 110, 112 as receiving the data transmission (e.g., the receiving wireless communication devices), wireless communication devices 108, 110, 112 are also capable of transmitting their own respective data transmissions.

Figure 5:
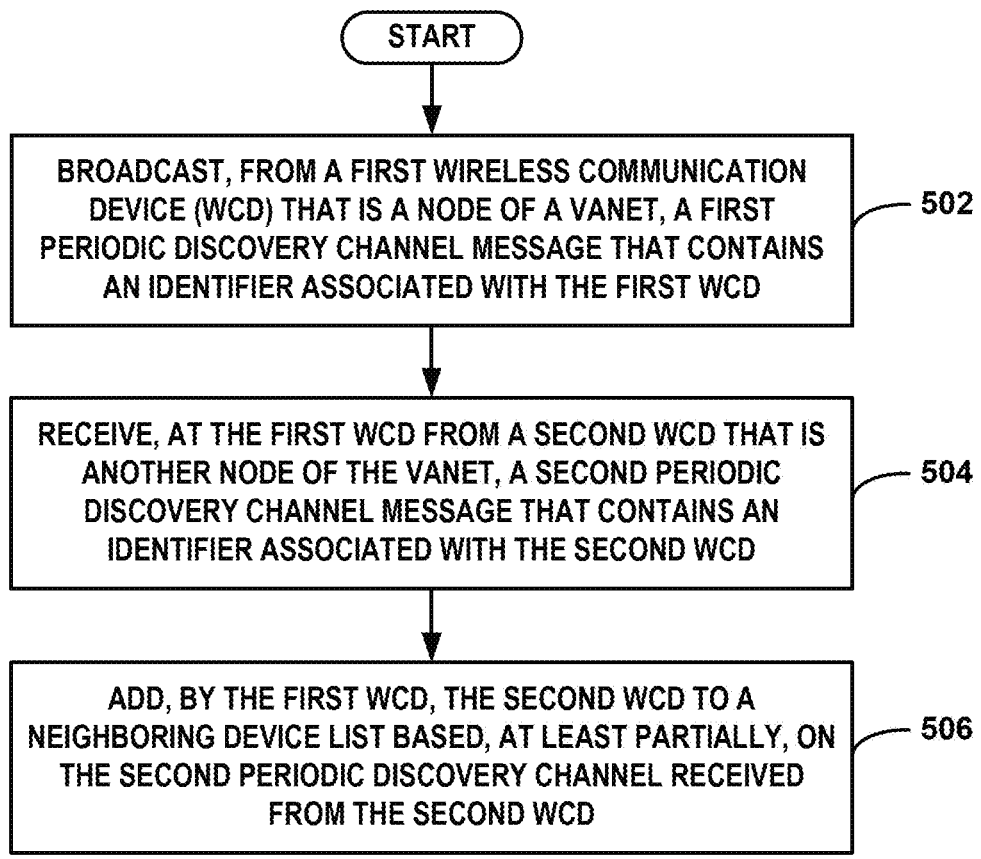
FIG. 5 is a flowchart of an example of a method in which a first wireless communication device broadcasts first periodic discovery channel messages, receives second periodic discovery channel messages from a second wireless communication device, and adds the second wireless communication device to a neighboring device list.

FIG. 5 is a flowchart of an example of a method in which a first wireless communication device broadcasts first periodic discovery channel messages, receives second periodic discovery channel messages from a second wireless communication device, and adds the second wireless communication device to a neighboring device list. The method 500 begins at step 502 with broadcasting, from first wireless communication device 106, which is a node of VANET 100, a first periodic discovery channel message that contains an identifier associated with first wireless communication device 106. At step 504, first wireless communication device 106 receives, from second wireless communication device 108, which is another node of VANET 100, a second periodic discovery channel message that contains an identifier associated with second wireless communication device 108. At step 506, first wireless communication device 106 adds second wireless communication device 108 to a neighboring device list based, at least partially, on the second periodic discovery channel received from second wireless communication device 108. In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
broadcasting, from a first wireless communication device that is a node of a vehicle ad-hoc network (VANET), a first periodic discovery channel message with a periodicity that is based, at least partially, on an expected rate of change of a neighboring device list, the first periodic discovery channel message containing an identifier associated with the first wireless communication device;
receiving, at the first wireless communication device from a second wireless communication device that is another node of the VANET, a second periodic discovery channel message that contains an identifier associated with the second wireless communication device; and
adding, by the first wireless communication device, the second wireless communication device to the neighboring device list based, at least partially, on the second periodic discovery channel received from the second wireless communication device.

2. The method of claim 1, wherein broadcasting the first periodic discovery channel message comprises transmitting the first periodic discovery channel message using a pre-defined transmit power and modulation and coding scheme (MCS).

3. The method of claim 1, wherein broadcasting the first periodic discovery channel message is triggered by one or more of the following: data arriving at a data buffer of the first wireless communication device, and receiving, at the first wireless communication device, a periodic discovery channel message from another wireless communication device that is another node of the VANET.

4. The method of claim 1, wherein the second periodic discovery channel message comprises channel state information feedback indicative of channel characteristics of a channel between the first wireless communication device and the second wireless communication device.

5. The method of claim 1, wherein the first periodic discovery channel message comprises at least one of the following: a destination identifier associated with at least one intended recipient wireless communication device, a reference signal, resource location information associated with a future data transmission, transmit power information associated with a future data transmission, modulation and coding scheme (MCS) information associated with a future data transmission, multiple-input and multiple-output (MIMO) parameter information associated with a future data transmission, resource location information associated with an expected response message from at least one intended recipient wireless communication device, Global Positioning System (GPS) information associated with the first wireless communication device, or a message identifier to identify at least one of the following: message type, sequence, priority, or an application identifier.

6. The method of claim 1, wherein the second periodic discovery channel message contains a confirmation message sent in response to the first periodic discovery channel message.

7. The method of claim 1, further comprising:
periodically updating the neighboring device list based, at least partially, on periodic discovery channel messages received from at least one other wireless communication device that is a node of the VANET.

8. The method of claim 1, further comprising:
receiving, at the first wireless communication device from the second wireless communication device, a negative-acknowledgement (NACK) in response to an inability of the second wireless communication device to decode a data transmission intended for the second wireless communication device.

9. The method of claim 8, wherein the NACK is transmitted from the second wireless communication device when the first wireless communication device is on a neighboring device list of the second wireless communication device.

10. The method of claim 8, wherein the NACK is transmitted from the second wireless communication device via one of the following: a resource location associated with an expected response message from the second wireless communication device, and a next second periodic discovery channel message transmitted from the second wireless communication device.

11. The method of claim 1, further comprising:
receiving, at the first wireless communication device from the second wireless communication device, a feedback message in response to a determination that channel conditions between the first wireless communication device and the second wireless communication device are below a threshold, the determination based on a reference signal received at the second wireless communication device from the first wireless communication device.

12. A wireless communication device that is a node of a vehicle ad-hoc network (VANET), the wireless communication device comprising:
a transmitter configured to broadcast a first periodic discovery channel message with a periodicity that is based, at least partially, on an expected rate of change of the neighboring device list, the first periodic discovery channel message containing an identifier associated with the wireless communication device;
a receiver configured to receive, from a second wireless communication device that is another node of the VANET, a second periodic discovery channel message that contains an identifier associated with the second wireless communication device; and
a controller configured to add the second wireless communication device to the neighboring device list based, at least partially, on the second periodic discovery channel received from the second wireless communication device.

13. The wireless communication device of claim 12, wherein the transmitter is further configured to transmit the first periodic discovery channel message using a pre-defined transmit power and modulation and coding scheme (MCS).

14. The wireless communication device of claim 12, wherein the transmitter is further configured to broadcast the first periodic discovery channel message upon the occurrence of one or more of the following: data arriving at a data buffer of the wireless communication device, and receiving, at the wireless communication device, a periodic discovery channel message from another wireless communication device that is another node of the VANET.

15. The wireless communication device of claim 12, wherein the second periodic discovery channel message comprises channel state information feedback indicative of channel characteristics of a channel between the first wireless communication device and the second wireless communication device.

16. The wireless communication device of claim 12, wherein the first periodic discovery channel message comprises at least one of the following: a destination identifier associated with at least one intended recipient wireless communication device, a reference signal, resource location information associated with a future data transmission, transmit power information associated with a future data transmission, modulation and coding scheme (MCS) information associated with a future data transmission, multiple-input and multiple-output (MIMO) parameter information associated with a future data transmission, resource location information associated with an expected response message from at least one intended recipient wireless communication device, Global Positioning System (GPS) information associated with the first wireless communication device, or a message identifier to identify at least one of the following: message type, sequence, priority, or an application identifier.

17. The wireless communication device of claim 12, wherein the second periodic discovery channel message contains a confirmation message sent in response to the first periodic discovery channel message.

18. The wireless communication device of claim 12, wherein the controller is further configured to periodically update the neighboring device list based, at least partially, on periodic discovery channel messages received from at least one other wireless communication device that is a node of the VANET.

19. The wireless communication device of claim 12, wherein the receiver is further configured to receive, from the second wireless communication device, a negative-acknowledgement (NACK) in response to an inability of the second wireless communication device to decode a data transmission intended for the second wireless communication device.

20. The wireless communication device of claim 19, wherein the NACK is transmitted from the second wireless communication device when the wireless communication device is on a neighboring device list of the second wireless communication device.

21. The wireless communication device of claim 19, wherein the NACK is transmitted from the second wireless communication device via one of the following: a resource location associated with an expected response message from the second wireless communication device, and a next second periodic discovery channel message transmitted from the second wireless communication device.

22. The wireless communication device of claim 12, wherein the receiver is further configured to receive, from the second wireless communication device, a feedback message in response to a determination that channel conditions between the wireless communication device and the second wireless communication device are below a threshold, the determination based on a reference signal received at the second wireless communication device from the wireless communication device.

23. A method comprising:
broadcasting, from a first wireless communication device that is a node of a vehicle ad-hoc network (VANET), a first periodic discovery channel message that contains an identifier associated with the first wireless communication device;
receiving, at the first wireless communication device from at least one other wireless communication device that is another node of the VANET, a second periodic discovery channel message that contains an identifier associated with the at least one other wireless communication device;
adding, by the first wireless communication device, the at least one other wireless communication device to a neighboring device list based, at least partially, on the at least one other periodic discovery channel received from the at least one other wireless communication device;
transmitting a groupcast transmission from the first wireless communication device;
receiving, at the first wireless communication device, a negative-acknowledgement (NACK) transmitted in response to the groupcast transmission, performing an action in response to the NACK if the NACK was transmitted from a listed wireless communication device included in the neighboring device list.

24. A wireless communication device that is a node of a vehicle ad-hoc network (VANET), the wireless communication device comprising:
a transmitter configured to broadcast a periodic discovery channel message that contains an identifier associated with the wireless communication device;
a receiver configured to receive, from at least one other wireless communication device that is another node of the VANET, at least one other periodic discovery channel message that contains an identifier associated with the at least one other wireless communication device; and
a controller configured to add the at least one other wireless communication device to a neighboring device list based, at least partially, on the at least one other periodic discovery channel received from the at least one other wireless communication device;
the transmitter configured to transmit a groupcast transmission,
the receiver configured to receive a negative-acknowledgement (NACK) transmitted in response to the groupcast transmission,
the controller configured to perform an action in response to the NACK if the NACK was transmitted from a listed wireless communication device included in the neighboring device list.

* * * * *